US012678693B2

(12) United States Patent
Feng et al.

(10) Patent No.: US 12,678,693 B2
(45) Date of Patent: Jul. 14, 2026

(54) METHOD AND APPARATUS FOR DISPLAYING GAME, AND TERMINAL

(71) Applicant: NETEASE (HANGZHOU) NETWORK CO., LTD., Zhejiang (CN)

(72) Inventors: Yiming Feng, Zhejiang (CN); Junxian Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 744 days.

(21) Appl. No.: 18/016,398

(22) PCT Filed: Jan. 19, 2022

(86) PCT No.: PCT/CN2022/072705
§ 371 (c)(1),
(2) Date: Jan. 16, 2023

(87) PCT Pub. No.: WO2022/247319
PCT Pub. Date: Dec. 1, 2022

(65) Prior Publication Data
US 2023/0338848 A1 Oct. 26, 2023

(30) Foreign Application Priority Data

May 25, 2021 (CN) .......................... 202110574702.0

(51) Int. Cl.
*A63F 13/5372* (2014.01)
*A63F 13/2145* (2014.01)

(52) U.S. Cl.
CPC ...... *A63F 13/5372* (2014.09); *A63F 13/2145* (2014.09)

(58) Field of Classification Search
None
See application file for complete search history.

(56) References Cited

U.S. PATENT DOCUMENTS

| 7,326,117 B1 * | 2/2008 | Best | A63F 13/843 |
| | | | 463/32 |
| 11,628,362 B2 * | 4/2023 | Kakizawa | A63F 13/56 |
| | | | 463/31 |

(Continued)

FOREIGN PATENT DOCUMENTS

| CN | 101634568 A * | 1/2010 | G09B 29/106 |
| CN | 111202985 A | 5/2020 | |

(Continued)

OTHER PUBLICATIONS

International Search Report issued by the Chinese Patent Office for application No. PCT/CN2022/072705 on Apr. 19, 2022.

(Continued)

*Primary Examiner* — Tramar Harper
(74) *Attorney, Agent, or Firm* — IP & T GROUP LLP

(57) ABSTRACT

Provided are a method and an apparatus for displaying a game and a terminal, which provides a graphical user interface of the game through a touch terminal, wherein the graphical user interface comprises a large map of a game scene, the method comprises steps of: providing at least two virtual earth surface units in the large map of the game scene, wherein the virtual earth surface units respectively have a passage port; determining, in response to a first operation for a first virtual earth surface unit of the at least two virtual earth surface units, at least one second virtual earth surface unit having a communication relationship with a passage port of the first virtual earth surface unit of the at least two virtual earth surface units; and then, marking at least one path between the first virtual earth surface unit and the second virtual earth surface unit.

16 Claims, 4 Drawing Sheets

(56) References Cited

U.S. PATENT DOCUMENTS

| | | | | |
|---|---|---|---|---|
| 2002/0063654 A1* | 5/2002 | Aoyama | ................ | G01C 21/20 |
| | | | | 342/357.57 |
| 2002/0119819 A1* | 8/2002 | Kunzle | ................... | A63F 13/35 |
| | | | | 463/33 |
| 2004/0008225 A1* | 1/2004 | Campbell | .......... | G06F 16/9537 |
| | | | | 715/764 |
| 2004/0143852 A1* | 7/2004 | Meyers | ................ | A63F 13/822 |
| | | | | 463/43 |
| 2008/0167129 A1* | 7/2008 | Aaron | .................... | A63F 13/65 |
| | | | | 463/42 |
| 2009/0005139 A1* | 1/2009 | Morimoto | .............. | A63F 13/57 |
| | | | | 463/43 |
| 2009/0104990 A1 | 4/2009 | Tsujino et al. | | |
| 2010/0285876 A1 | 11/2010 | Takahashi et al. | | |
| 2011/0224896 A1* | 9/2011 | Napieraj | ........... | G01C 21/3614 |
| | | | | 715/702 |
| 2011/0256912 A1* | 10/2011 | Baynes | ................ | A63F 13/803 |
| | | | | 463/43 |
| 2013/0191211 A1* | 7/2013 | Nichols | ................. | G06Q 30/02 |
| | | | | 705/14.49 |
| 2013/0326380 A1* | 12/2013 | Lai | ..................... | G06F 3/04815 |
| | | | | 715/765 |
| 2014/0089862 A1* | 3/2014 | Jones | ................. | A63F 13/5375 |
| | | | | 715/851 |
| 2021/0052975 A1* | 2/2021 | Shiba | ..................... | A63F 13/35 |
| 2021/0322873 A1* | 10/2021 | Jarrett | ................ | A63F 13/2145 |
| 2023/0139739 A1* | 5/2023 | Brown | ................ | B60K 35/213 |

FOREIGN PATENT DOCUMENTS

| | | | | | |
|---|---|---|---|---|---|
| CN | 111494926 A | | 8/2020 | | |
| CN | 112402962 A | | 2/2021 | | |
| CN | 113304480 A | | 8/2021 | | |
| EP | 2273236 A2 | * | 1/2011 | .............. | G08G 1/20 |
| EP | 2843368 A2 | * | 3/2015 | ........ | G01C 21/3629 |
| EP | 3650089 A1 | * | 5/2020 | .......... | G06F 11/3684 |
| JP | 2013009770 A | * | 1/2013 | | |
| WO | WO-2010058731 A1 | * | 5/2010 | ............ | A63F 13/47 |

OTHER PUBLICATIONS

Written Opinion of the International Search Authority issued by the Chinese patent Office for Application No. PCT/CN2022/072705 on Apr. 19, 2022.

First Office Action of priority document of CN 202110574702.0 issued by the Chinese Patent Office on Oct. 28, 2023.

Notification to Grant Patent Right for Invention of priority document CN 202110574702.0 issued by the Chinese Patent Office on May 14, 2024.

* cited by examiner

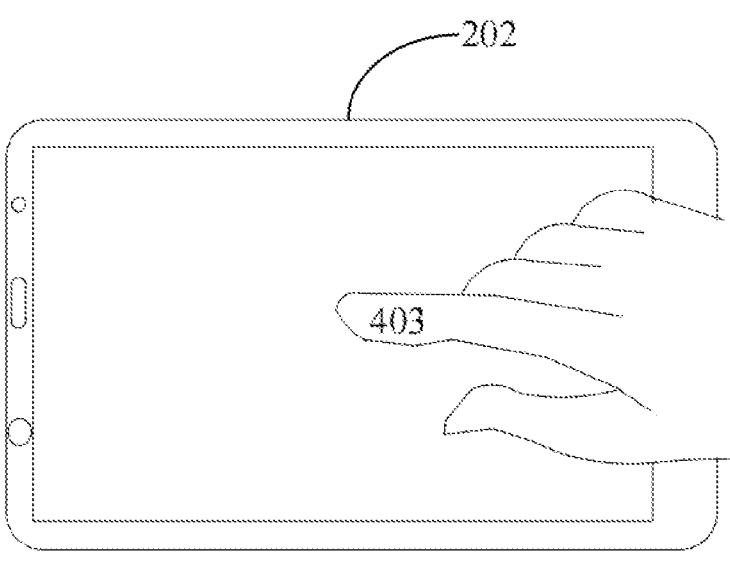

FIG. 3 providing at least two virtual earth surface units in the large map of the game scene, wherein the virtual earth surface units respectively have a passage port;    S402 determining, in response to a first operation for a first virtual earth surface unit of the at least two virtual earth surface units, at least one second virtual earth surface unit having a communication relationship with a passage port of the first virtual earth surface unit of the at least two virtual earth surface units;    S404 marking at least one path between the first virtual earth surface unit and the second virtual earth surface unit.    S406

FIG. 4

METHOD AND APPARATUS FOR DISPLAYING GAME, AND TERMINAL

CROSS-REFERENCE TO RELATED APPLICATION

The present disclosure is a National Stage of International Application No. PCT/CN2022/072705 filed on Jan. 19, 2022, which claims priority of Chinese patent application with the filing number 202110574702.0 filed on May 25, 2021 with the Chinese Patent Office, and entitled "Method and Apparatus for Displaying Game, and Terminal", the contents of which are incorporated herein by reference in entirety.

TECHNICAL FIELD

The present disclosure relates to the technical field of games, and in particular, to a method and an apparatus for displaying game, and a terminal.

BACKGROUND ART

When terrain rendering in three-dimensional (3D) games is performed, the entire terrain is usually divided into several virtual landmasses, wherein buildings, mountains, cities, rivers, etc. are placed on each virtual landmass, which can be called a virtual earth surface unit.

SUMMARY

According to an aspect of the present disclosure provide a method for displaying a game, providing a graphical user interface of the game through a touch terminal, wherein the graphical user interface comprises a large map of a game scene, wherein the method comprises steps of: providing at least two virtual earth surface units in the large map of the game scene, wherein the virtual earth surface units respectively have a passage port; determining, in response to a first operation for a first virtual earth surface unit of the at least two virtual earth surface units, at least one second virtual earth surface unit having a communication relationship with a passage port of the first virtual earth surface unit of the at least two virtual earth surface units; and marking at least one path between the first virtual earth surface unit and the second virtual earth surface unit.

According to another aspect of the present disclosure further provide a terminal, comprising a memory and a processor, wherein a computer program that can be run on the processor is stored in the memory, when the processor executes the computer program, the steps of the method according to the above aspect are implemented.

According to another aspect of the present disclosure further provide a non-transitory storage medium storing machine-executable instructions, when the machine-executable instructions (computer-executable instructions) are invoked and executed by a processor, the machine-executable instructions cause the processor to perform the method according to the above aspect.

BRIEF DESCRIPTION OF DRAWINGS

In order to more clearly illustrate the specific embodiments of the present disclosure or the technical solutions in the prior art, drawings which need to be used for description of the specific embodiments or the prior art will be introduced briefly below, and apparently, the drawings in the following description show some embodiments of the present disclosure, and those ordinarily skilled in the art still could obtain other drawings in light of these drawings, without using any inventive efforts.

FIG. 3 is a schematic view of a usage scene of a touch terminal provided by an embodiment of the present disclosure;

FIG. 4 is a schematic view of a flowchart of a method for displaying a game provided by an embodiment of the present disclosure;

DETAILED DESCRIPTION OF EMBODIMENTS

Figure 1:
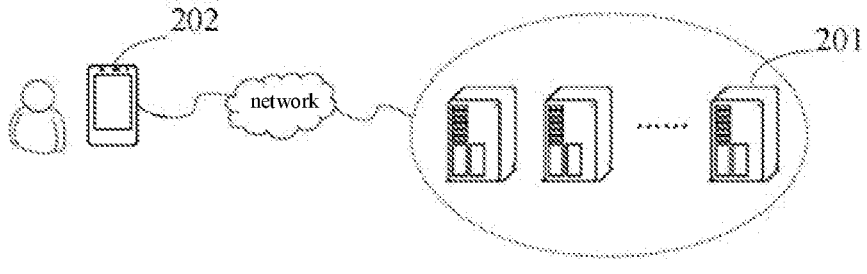
FIG. 1 is a schematic view of an application scene provided by an embodiment of the present disclosure.

The technical solutions of the present disclosure will be clearly and completely described below with reference to the embodiments, obviously, the described embodiments are part of embodiments of the present disclosure, rather than all embodiments. Based on the embodiments in the present disclosure, all other embodiments obtained by those ordinarily skilled in the art, without making inventive effort, fall within the protection scope of the present disclosure.

In the existing mountain terrain map, some landmasses are surrounded by mountains, that is, there are displayed mountain virtual earth surface units, and there may also be rivers separating the mountain. When players or teams enter a landmass surrounded by mountains, it is generally difficult to travel, so there is usually a passage on the mountain virtual earth surface unit, that is, a tunnel, players or teams can quickly pass through the mountain terrain region via the tunnel, however, everything is unknown for players after the existing teams enter the tunnel, they can neither know the travelling route of the teams, nor can predict which exit the teams will exit the tunnel, which will cause certain confusion and poor user experience to users, simultaneously, due to uncertain factors, players may frequently drag the screen, causing a burden on game operations.

In the existing game terrain map, some of the landmasses are surrounded by mountains, and characters or teams cannot enter without going through the tunnel. Therefore, tunnels are provided in the mountains, that is, passage ports are provided on the virtual earth surface units, however, there are many passage ports, if the player enters the passage entrance on certain virtual earth surface unit, it is difficult to know the position of the passage exit corresponding to the currently entered passage entrance. Especially when the passage entrance and the passage exit are far apart, it is impossible to know where the passage exit that is communicated with the current passage entrance is, which will cause the player to have psychological burden of confusion, have poor user experience, or need to drag the screen many times to find the passage exit, which is very inconvenient for players to operate.

Based on this, the embodiments of the present disclosure provide a method and an apparatus for displaying a game, and a terminal, so as to solve the technical problems that the existing method for displaying a game has poor display effect and is inconvenient for players to operate.

The method for displaying a game in the embodiments of the present disclosure can be applied to various types of computer devices, for example, a touch terminal and a non-touch terminal. In the above, the touch terminal may include a touch screen and a processor, and the touch screen is used for presenting a graphical user interface and receiving operations for the graphical user interface.

In some embodiments, when the graphical user interface is operated through the touch terminal, the graphical user interface may be used to operate the local content of the touch terminal, or may be used to operate the content of the peer server.

For example, as shown in FIG. 1, FIG. 1 is a schematic view of an application scene provided by an embodiment of the present disclosure. The application scene may include a touch terminal (e.g., a mobile phone 202) and a server 201, and the touch terminal may communicate with the server 201 through a wired network or a wireless network, wherein the touch terminal is used for running a virtual desktop, and through the virtual desktop, the touch terminal can interact with the server 201 to operate the content in the server 201.

Figure 2:
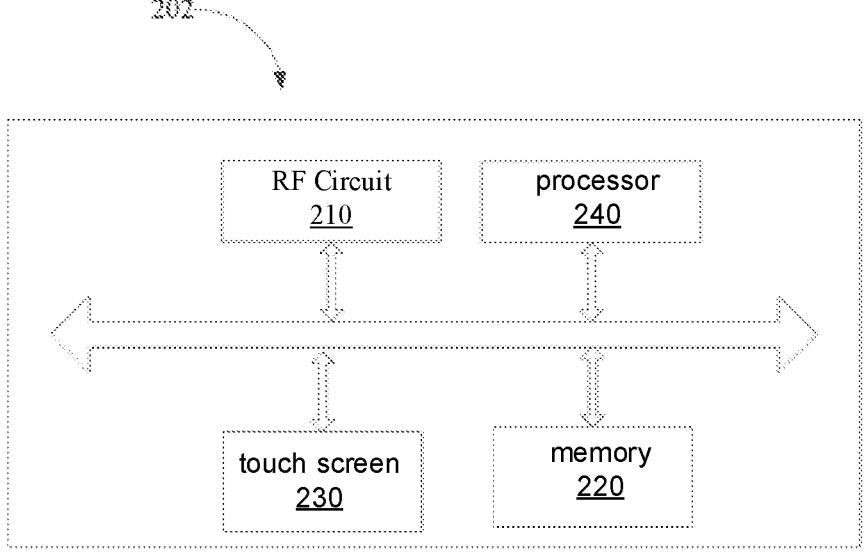
FIG. 2 is a structural schematic view of a mobile phone provided by an embodiment of the present disclosure.

The touch terminal in this embodiment is described by taking the mobile phone 202 as an example. The mobile phone 202 includes a radio frequency (RF for short) circuit 210, a memory 220, a touch screen 230, a processor 240 and other components. Those skilled in the art can understand that, the structure of the mobile phone shown in FIG. 2 does not constitute a limitation on the mobile phone, and may include more or less components than the one shown in the figure, or is combined with some components, or is split into some components, or is in different component arrangements. Those skilled in the art can understand that the touch screen 230 belongs to a user interface (UI for short), and the mobile phone 202 may include less user interface than one shown in the figure.

RF circuit 210 may also communicate with network and other devices via a wireless communication, wherein the wireless communication can use any communication standard or protocol, which includes but is not limited to Global System of Mobile Communication (GSM for short), General Packet Radio Service (GPRS for short), Code Division Multiple Access (CDMA for short), Wideband Code Division Multiple Access (WCDMA for short), Long Term Evolution (LTE for short), E-mail, and Short Messaging Service (SMS for short), etc.

The memory 220 can be used to store software programs and modules, and the processor 240 executes various functional applications and data processing of the mobile phone 202 by running the software programs and modules stored in the memory 220. The memory 220 may mainly include a program storing area and a data storing area, wherein the program storing area may store an operating system, an application program required for at least one function and the like; and the data storing area may store data, etc., created according to the usage of the mobile phone 202. In addition, memory 220 may include high-speed random access memory, and may also include non-volatile memory, such as at least one magnetic disk storage device, flash memory device, or other volatile solid state storage device.

The touch screen 230 may be used to display a graphical user interface and receive user operations for the graphical user interface. A touch screen 230 specifically may include a display panel and a touch panel, wherein the display panel may be configured in the form of using a liquid crystal display (LCD for short), and an organic light-emitting diode (OLED for short) and the like. The touch panel can collect the user's contact or non-contact operations on or near it (for example, as shown in FIG. 3, the user operations on or near the touch panel using any suitable object or accessory such as a finger 403, a stylus, or the like), and generate preset operation instructions. In addition, the touch panel may include two parts, namely, a touch detection apparatus and a touch controller, wherein the touch detection apparatus detects the user's touch orientation and posture, detects the signal brought by the touch operation, and transmits the signal to the touch controller; the touch controller receives the touch information from the touch detection apparatus, converts it into information that the processor can process, and then sends it to the processor 240, and can receive the commands sent by the processor 240 and execute them. Furthermore, the touch panel can be realized by various types of resistance type, capacitive type, infrared, and surface acoustic wave technology, etc., or any technology developed in the future can be also used to realize the touch panel. Further, the touch panel can cover the display panel, and the user can operate on or near the touch panel covered on the display panel according to the graphical user interface displayed on the display panel. After detecting an operation on or near it, the touch panel transmits it to the processor 240 to determine the user input, and the processor 240 then provides corresponding visual output on the display panel in response to the user input. In addition, the touch panel and the display panel can be implemented as two independent components or can be integrated.

The processor 240 is a control center of the mobile phone 202, which uses various interfaces and lines to connect various parts of the entire mobile phone, runs or executes the software programs and/or modules stored in the memory 220, calls the data stored in the memory 220, and executes various functions and processes data of the mobile phone 202, so as to monitor the mobile phone as a whole.

Some embodiments of the present disclosure will be described in detail below with reference to the drawings. The embodiments described below and features of the embodiments may be combined with each other without conflict.

FIG. 4 is a schematic view of a flowchart of a method for displaying a game provided by an embodiment of the present disclosure. The method can provide a graphical user interface of the game through a touch terminal (for example, mobile phone 202), wherein the graphical user interface includes a large map of a game scene, as shown in FIG. 4, the method can include the following steps.

Step S402, at least two virtual earth surface units in the large map of the game scene are provided, wherein the virtual earth surface units respectively have a passage port.

In the embodiment of the present disclosure, the virtual earth surface unit may be a mountain, each virtual earth surface unit may have a passage, that is, a tunnel, and the passage port may be the entrance of the tunnel, the exit of the tunnel, or both the entrance and the exit.

In the example of the present disclosure, the passage port can be marked with a corresponding identification, such as a highlighting passage port, and further, it can be expressed in the form of highlight to simulate the scene of light in the tunnel, so as to simulate the real scene.

Step S404, at least one second virtual earth surface unit having a communication relationship with a passage port of the first virtual earth surface unit of the at least two virtual earth surface units is determined, in response to a first operation for a first virtual earth surface unit of the at least two virtual earth surface units.

In the embodiment of the present disclosure, the above-mentioned large map of the game scene may be the main interface of the game scene, wherein there are at least two virtual earth surface units, the virtual earth surface units may specifically be mountains, and each virtual earth surface unit corresponds to a virtual landmass.

As an example, the above-mentioned first operation may be a click operation, that is, when the player clicks on the first virtual earth surface unit, the touch terminal will respond to the above-mentioned click operation, so as to set the first virtual earth surface unit to be in a selected state, and then determine at least one second virtual earth surface unit having a communication relationship with the passage port of the first virtual earth surface unit.

It should be noted that, in the embodiment of the present disclosure, the communication relationship between the virtual earth surface units may be preset, and the communication relationship may be unidirectional, for example, teams are only allowed to enter through the tunnel port of the first virtual earth surface unit (that is, the passage port) and exit from the tunnel port of the second virtual earth surface unit; or the teams are only allowed to enter through the tunnel port of the second virtual earth surface unit and exit from the tunnel port of the first virtual earth surface unit; the communication relationship may also be bidirectional, that is, if teams enter through the tunnel port of the first virtual earth surface unit, they can exit from the tunnel port of the second virtual earth surface unit. If the teams enter through the tunnel port of the second virtual earth surface unit, they can exit from the tunnel port of the first virtual earth surface unit.

Step S406, at least one path between the first virtual earth surface unit and the second virtual earth surface unit is marked.

After at least one second virtual earth surface unit having a communication relationship with the passage port of the first virtual earth surface unit is determined, at least one path between the first virtual earth surface unit and the second virtual earth surface unit is further marked.

When there are many mountain virtual earth surface units in the large map of the game scene, there are usually multiple passage ports existing in one mountain virtual earth surface unit. In order to facilitate the player to slide the screen to find the corresponding entrance and exit of the tunnel, in terms of UI performance, the mountain virtual earth surface units need to be communicated. As an example, the above path includes a first virtual earth surface unit, a second virtual earth surface unit, and at least one third virtual earth surface unit connecting the first virtual earth surface unit and the second virtual earth surface unit. The at least two virtual earth surface units described above include a third virtual earth surface unit.

As an example, the distance between the first virtual earth surface unit and the second virtual earth surface unit in the large map of the game scene is greater than a preset distance.

That is to say, when the passage port of the first virtual earth surface unit is far away from the passage port of the second virtual earth surface unit having a communication relationship, after the above marking is performed, the player can be guided to slide from the first virtual earth surface unit to the second virtual earth surface unit by marking the path between the first virtual earth surface unit and the second virtual earth surface unit, which is convenient for players to observe the relative positions of the two, easy for players to operate, and has a good user experience.

It should be noted that players can enter all the passage ports on the virtual earth surface units of the embodiments of the present disclosure, but one entrance only corresponds to a specific exit, and generally one entrance corresponds to one exit. In the display method of the embodiments of the present disclosure, if the player sees many entrances and exits of passages on one mountain virtual earth surface unit, after the player clicks on the virtual earth surface unit to which the entrance and exit of the passage belong, the associated paths and entrances and exits will be marked, which is convenient for players and users to have a clear understanding of the routes, without being confused, thereby improving the players game experience.

In an embodiment of the present disclosure, a method for displaying a game is provided, which provides a graphical user interface of the game through a touch terminal, wherein the graphical user interface comprises a large map of a game scene, the method comprises steps of: providing at least two virtual earth surface units in the large map of the game scene, wherein the virtual earth surface units respectively have a passage port; determining, in response to a first operation for a first virtual earth surface unit of the at least two virtual earth surface units, at least one second virtual earth surface unit having a communication relationship with a passage port of the first virtual earth surface unit of the at least two virtual earth surface units; and then, marking at least one path between the first virtual earth surface unit and the second virtual earth surface unit. It can be seen from the above description that in the method for displaying a game of the embodiments of the present disclosure, at least one path between a first virtual earth surface unit with a passage port and a second virtual earth surface unit having a communication relationship with the above-mentioned passage port can be marked, the player can clearly know the travel route after entering the passage port, thereby assisting the player in performing the game operation, having good user experience, and solving the technical problems that the existing method for displaying a game has poor display effect and is inconvenient for players to operate.

The embodiments of the present disclosure provide an interactive method that allows the player to intuitively view the second virtual earth surface unit having the communication relationship with the passage port of the first virtual earth surface unit, which is convenient for the player to observe the relative positions of the two. In addition, it is also possible to quickly jump to the second game visual field region of the second virtual earth surface unit, and to mark the corresponding abbreviated path in the small map corresponding to the large map of the game scene.

In some embodiments, the above-mentioned step of marking at least one path between the first virtual earth surface unit and the second virtual earth surface unit comprises:

marking, in response to a sliding operation on the large map of the game scene, road segments on the at least one path in sequence according to the sliding operation.

As an example, a sliding direction of the sliding operation is determined, and a target path to be marked is determined according to the sliding direction; and the road segments on the target path are marked in sequence according to a sliding distance of the sliding operation.

In some embodiments, before responding to a sliding operation on the large map of the game scene, the method further comprises:

marking, by taking the first virtual earth surface unit as a starting point, a preset length of a road segment on the at least one path.

The above-mentioned preset length of the road segment may be a road segment that can be displayed in the game display interface.

As an example, a preset icon can be used to mark each road segment on at least one path between the first virtual earth surface unit and the second virtual earth surface unit in sequence, the above-mentioned preset icon is located above the corresponding road segment, and the preset icon is transparent. It should be noted that the size, length or width of the preset icon corresponding to each road segment may be the same or different. For example, the width of the preset icon corresponding to each road segment can be set to be the same, and the length of the corresponding preset icon can be adjusted according to the length of the mountain. The preset icon is pasted on the corresponding virtual landmass, if there is a virtual earth surface unit on the virtual landmass, the preset icon is pasted on the corresponding virtual earth surface unit.

Figure 5:
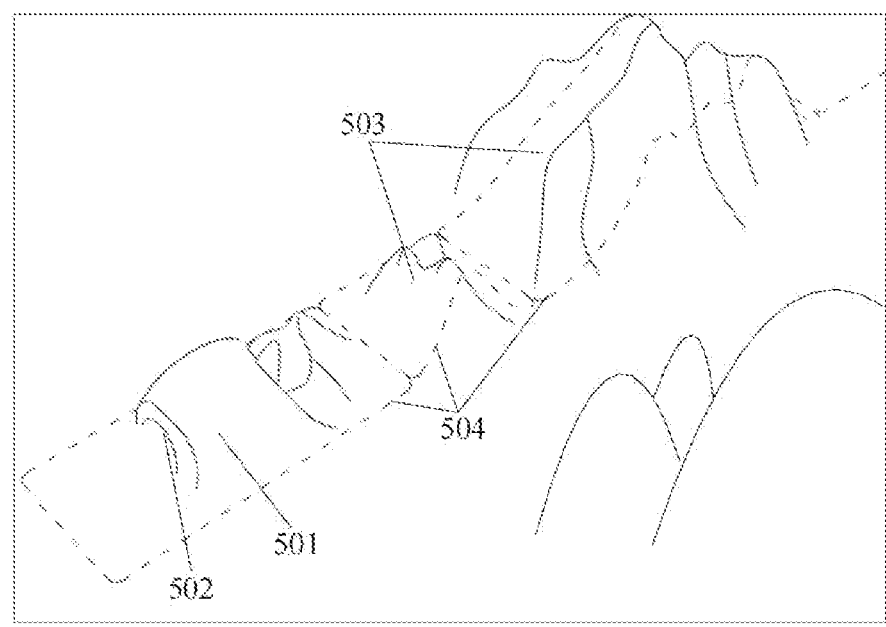
FIG. 5 is a schematic view of a game interface provided by an embodiment of the present disclosure.

Referring to FIG. 5, the first virtual earth surface unit 501 is a mountain virtual earth surface unit with a passage port 502, which is the starting point of the path, wherein the first virtual earth surface unit 501 and the third virtual earth surface unit 503 communicated to the first virtual earth surface unit 501 together form the preset length of road segment in the path, the preset icon 504 is located above the virtual earth surface unit, and may be a rectangular frame, the embodiments of the present disclosure does not perform specific restrictions on the above-mentioned preset icon.

In some embodiments, a distance between each road segment and a virtual lens in the game is determined; a transparency of the preset icon corresponding to each road segment is set respectively, according to the distance between each road segment and the virtual lens in the game. It may be that the greater the distance is, the greater the transparency is, which is convenient for the player to view the path. The embodiment of the present disclosure does not perform specific restrictions on the setting of the above-mentioned transparency.

In some embodiments, the step of marking at least one path between the first virtual earth surface unit and the second virtual earth surface unit comprises:

marking one shortest path between the first virtual earth surface unit and the second virtual earth surface unit.

In some embodiments, the method further comprises: hiddening the marker, in response to a touch operation on region other than the marked path in the large map of the game scene.

In some embodiments, the method further comprises: displaying, in response to the first operation for the first virtual earth surface unit of the at least two virtual earth surface units, a function control in a region associated with the first virtual earth surface unit.

Figure 6:
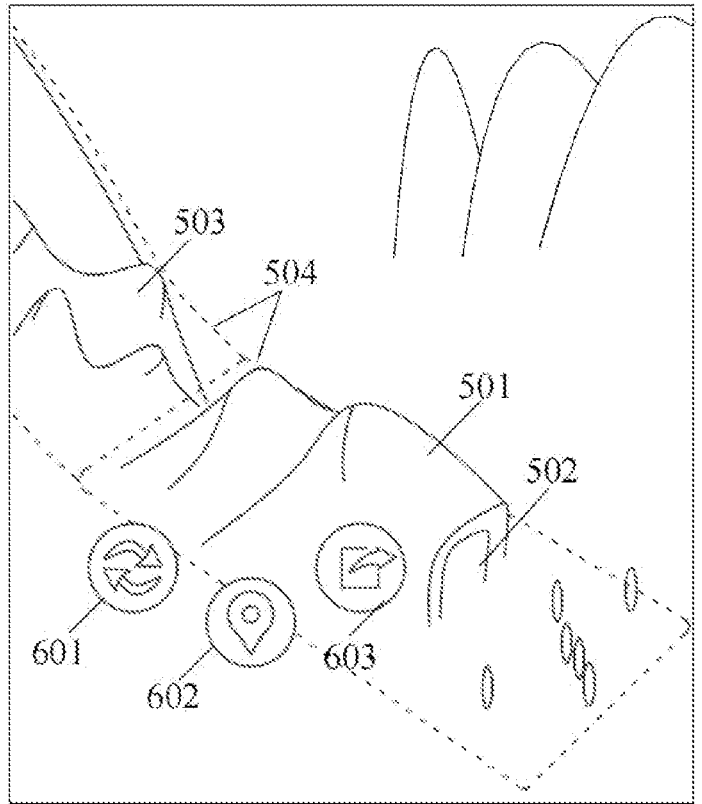
FIG. 6 is a schematic view of another game interface provided by an embodiment of the present disclosure.

The above-mentioned first operation can be a click operation, that is, when the player clicks on the first virtual earth surface unit, in addition to marking at least one path between the first virtual earth surface unit and the second virtual earth surface unit, the function control are also displayed in the region associated with the first virtual earth surface unit, referring to FIG. 6, the first virtual earth surface unit 501 is a mountain virtual earth surface unit with a passage port 502, which is the starting point of the path, and the first virtual earth surface unit 501 and the third virtual earth surface unit 503 communicated with the first virtual earth surface unit 501 together form a preset length of road segment in the path, the preset icon 504 is located above the virtual earth surface unit, and a jump control 601, a positioning control 602 and a sharing control 603 are displayed at the position of the first virtual earth surface unit.

Referring to FIG. 6, the above-mentioned function control comprises a jump control 601; the method further comprises: controlling, in response to a second operation for the jump control, a current first game visual field region to jump to a second game visual field region, wherein the first game visual field region comprises the first virtual earth surface unit, and the second game visual field region comprises the second virtual earth surface unit.

The above-mentioned second operation may be a click operation.

Referring to FIG. 6, the above-mentioned function control also includes at least one of the following: a positioning control 602, a sharing control 603, and an expedition control (not shown in FIG. 6); the method further includes:

marking, in response to a third operation for the positioning control, the position of the first virtual earth surface unit; and sharing, in response to the fourth operation for the sharing control, the position coordinates of the first virtual earth surface unit.

Both the third operation and the fourth operation described above may be click operations.

After the above-mentioned function controls are displayed, when the player clicks other positions in the large map of the game scene except the position at which the first virtual earth surface unit locates, the above-mentioned function controls will be hidden.

In some embodiments, the graphical user interface further comprises a small map corresponding to the large map of the game scene; the method further comprises: determining an abbreviated path in the small map corresponding to the path marked in the large map of the game scene; and marking the abbreviated path.

Figure 7:
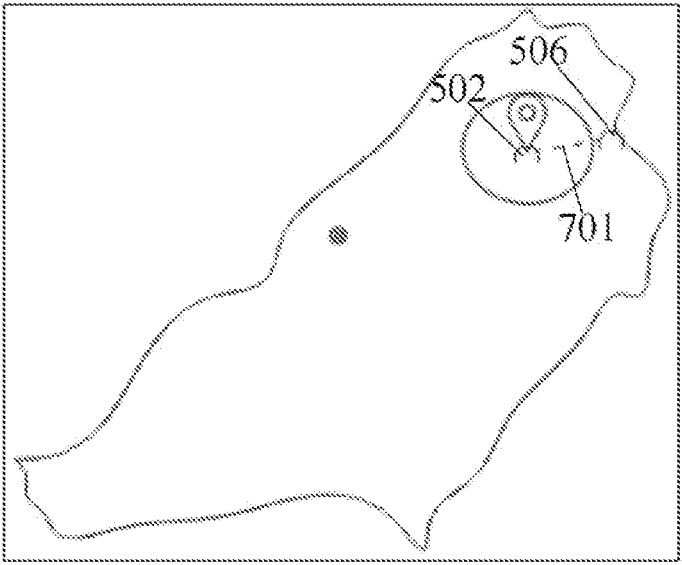
FIG. 7 is a schematic view of a small map of game provided by an embodiment of the present disclosure.

Referring to FIG. 7, FIG. 7 is a schematic view of a small map, FIG. 7 shows the passage port 502 for representing the first virtual earth surface unit and the passage port 506 for representing the second virtual earth surface unit on the small map, and the path 701 between the two is marked with a dotted line.

It should be noted that, by clicking the passage port on the small map, the abbreviated path between the above-mentioned passage port and another passage port having a communication relationship with the above-mentioned passage port can also be marked.

Figure 8:
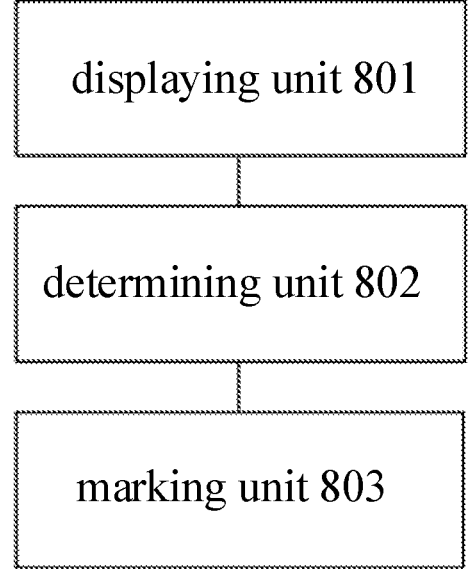
FIG. 8 is a structural schematic view of an apparatus for displaying a game provided by an embodiment of the present disclosure.

FIG. 8 is a structural schematic view of an apparatus for displaying a game provided by an embodiment of the present disclosure, which provides a graphical user interface of the game through a touch terminal, wherein the graphical user interface comprises a large map of a game scene, as shown in FIG. 8, the apparatus comprises:

a displaying unit 801, configured to provide at least two virtual earth surface units in the large map of the game scene, wherein the virtual earth surface units respectively have a passage port;

a determining unit 802, configured to determine, in response to a first operation for a first virtual earth surface unit of the at least two virtual earth surface units, at least one second virtual earth surface unit having a communication relationship with a passage port of the first virtual earth surface unit of the at least two virtual earth surface units; and a marking unit 803, configured to mark at least one path between the first virtual earth surface unit and the second virtual earth surface unit.

In an embodiment of the present disclosure, an apparatus for displaying a game is provided, which provides a graphical user interface of the game through a touch terminal, wherein the graphical user interface comprises a large map of a game scene, the apparatus achieves providing at least two virtual earth surface units in the large map of the game scene, wherein the virtual earth surface units respectively have a passage port; determining, in response to a first operation for a first virtual earth surface unit of the at least two virtual earth surface units, at least one second virtual earth surface unit having a communication relationship with a passage port of the first virtual earth surface unit of the at least two virtual earth surface units; and then, marking at least one path between the first virtual earth surface unit and the second virtual earth surface unit. It can be seen from the above description that in the apparatus for displaying a game of the embodiments of the present disclosure, at least one path between a first virtual earth surface unit with a passage port and a second virtual earth surface unit having a communication relationship with the above-mentioned passage port can be marked, the player can clearly know the travel route after entering the passage port, thereby assisting the player in performing the game operation, having good user experience, and solving the technical problems that the existing method for displaying a game has poor display effect and is inconvenient for players to operate.

In some embodiments, the marking unit is further configured to mark, in response to a sliding operation on the large map of the game scene, a road segment on the at least one path in sequence according to the sliding operation.

In some embodiments, the marking unit is further configured to mark, by taking the first virtual earth surface unit as a starting point, a preset length of a road segment on the at least one path.

In some embodiments, the apparatus is further configured to display, in response to the first operation for the first virtual earth surface unit of the at least two virtual earth surface units, a function control in a region associated with the first virtual earth surface unit.

In some embodiments, the function control comprises a jump control; the apparatus is further configured to control, in response to a second operation for the jump control, a current first game visual field region to jump to a second game visual field region, wherein the first game visual field region comprises the first virtual earth surface unit, and the second game visual field region comprises the second virtual earth surface unit.

In some embodiments, the function control further comprises at least one of the following: a positioning control, a sharing control, and an expedition control.

In some embodiments, the distance between the first virtual earth surface unit and the second virtual earth surface unit in the large map of game scene is greater than a preset distance.

In some embodiments, the marking unit is further configured to mark one shortest path between the first virtual earth surface unit and the second virtual earth surface unit.

In some embodiments, the marking unit is further configured to use a preset icon to mark each road segment on at least one path between the first virtual earth surface unit and the second virtual earth surface unit in sequence, wherein the preset icon is located above the corresponding road segment, and the preset icon is transparent.

In some embodiments, the marking unit is further configured to determine a distance between each road segment and a virtual lens in the game; set, according to the distance between each road segment and the virtual lens in the game, a transparency of the preset icon corresponding to each road segment, respectively.

In some embodiments, the graphical user interface further comprises a small map corresponding to the large map of the game scene; the marking unit is further configured to determine an abbreviated path in the small map corresponding to the path marked in the large map of the game scene; and mark the abbreviated path.

In some embodiments, the marking unit is further configured to mark the abbreviated path with a dotted line.

In some embodiments, the apparatus is further configured to hidden the marker, in response to a touch operation on a region other than the marked path in the large map of the game scene.

In some embodiments, the marking unit is further configured to determine a sliding direction of the sliding operation, and determine a target path to be marked according to the sliding direction; and mark, according to a sliding distance of the sliding operation, the road segment on the target path in sequence.

In some embodiments, the path comprises the first virtual earth surface unit, the second virtual earth surface unit, and at least one third virtual earth surface unit connecting the first virtual earth surface unit and the second virtual earth surface unit, wherein at least two virtual earth surface units comprise the third virtual earth surface unit.

The implementation principles and generated technical effects of the apparatus provided by the embodiments of the present disclosure are the same as those of the foregoing method embodiments, for brief description, the parts not mentioned in the apparatus embodiments can refer to the corresponding content in the foregoing method embodiments.

Those skilled in the art can clearly understand that, for the convenience and brevity of the description, the specific working processes of the systems, apparatuses and units described above can all refer to the corresponding processes in the above-mentioned method embodiments, which will not be repeated here. The apparatus for displaying a game provided by the embodiments of the present disclosure has the same technical features as the method for displaying a game provided by the above-mentioned embodiments, which can also solve the same technical problem and achieve the same technical effect.

An embodiment of the present disclosure further provides a terminal, specifically, the terminal includes a processor and a storage apparatus, wherein a computer program is stored on the storage apparatus, and the computer program executes the method described in the above embodiments when the computer program is run by the processor. the method comprises following steps:

providing at least two virtual earth surface units in the large map of the game scene, wherein the virtual earth surface units respectively have a passage port;

determining, in response to a first operation for a first virtual earth surface unit of the at least two virtual earth surface units, at least one second virtual earth surface unit having a communication relationship with a passage port of the first virtual earth surface unit of the at least two virtual earth surface units; and setting a marking for at least one path between the first virtual earth surface unit and the second virtual earth surface unit.

Further, the step of marking at least one path between the first virtual earth surface unit and the second virtual earth surface unit comprises: marking, in response to a sliding operation on the large map of the game scene, road segments on the at least one path in sequence according to the sliding operation.

Further, before responding to a sliding operation on the large map of the game scene, the method further comprises: marking, by taking the first virtual earth surface unit as a starting point, a preset length of a road segment on the at least one path.

Further, the method further comprises: displaying, in response to the first operation for the first virtual earth surface unit of the at least two virtual earth surface units, a function control in a region associated with the first virtual earth surface unit.

Further, the function control comprises a jump control; the method further comprises: controlling, in response to a second operation for the jump control, a current first game visual field region to jump to a second game visual field region, wherein the first game visual field region comprises the first virtual earth surface unit, and the second game visual field region comprises the second virtual earth surface unit.

Further, the function control further comprises at least one of the following: a positioning control, a sharing control, and an expedition control.

Further, the distance between the first virtual earth surface unit and the second virtual earth surface unit in the large map of the game scene is greater than a preset distance.

Further, the step of marking at least one path between the first virtual earth surface unit and the second virtual earth surface unit comprises: marking the shortest path between the first virtual earth surface unit and the second virtual earth surface unit.

Further, the step of marking at least one path between the first virtual earth surface unit and the second virtual earth surface unit comprises: using a preset icon to mark each road segment on at least one path between the first virtual earth surface unit and the second virtual earth surface unit in sequence, wherein the preset icon is located above the corresponding road segment, and the preset icon is transparent.

Further, the method further comprises: determining a distance between each road segment and a virtual lens in the game; setting, according to the distance between each road segment and the virtual lens in the game, a transparency of the preset icon corresponding to each road segment, respectively.

Further, the graphical user interface further comprises a small map corresponding to the large map of the game scene; the method further comprises: determining an abbreviated path in the small map corresponding to the path marked in the large map of the game scene; and marking the abbreviated path.

Further, the step of marking the abbreviated path comprises: marking the abbreviated path with a dotted line.

Further, the method further comprises: hiddening the marking in response to a touch operation on a region other than the marked path in the large map of the game scene.

Further, the step of marking road segments on the at least one path in sequence according to the sliding operation comprises: determining a sliding direction of the sliding operation, and determining a target path to be marked according to the sliding direction; and marking, according to a sliding distance of the sliding operation, the road segments on the target path in sequence.

Further, the path comprises the first virtual earth surface unit, the second virtual earth surface unit, and at least one third virtual earth surface unit connecting the first virtual earth surface unit and the second virtual earth surface unit, wherein the at least two virtual earth surface units comprise the third virtual earth surface unit.

It can be seen from the above description that in the terminal of the present disclosure, at least one path between a first virtual earth surface unit with a passage port and a second virtual earth surface unit having a communication relationship with the above-mentioned passage port can be marked, the player can clearly know the travel route after entering the passage port, thereby assisting the player in performing the game operation, having good user experience, and solving the technical problems that the existing method for displaying a game has poor display effect and is inconvenient for players to operate.

Corresponding to the above-mentioned method for displaying a game, an embodiment of the present disclosure further provides a computer-readable storage medium, wherein the computer-readable storage medium stores machine-executable instructions, when the computer-executable instructions are invoked and executed by the processor, the computer-executable instructions cause the processor to execute the steps of the above-mentioned method for displaying a game, the steps comprise:

providing at least two virtual earth surface units in the large map of the game scene, wherein the virtual earth surface units respectively have a passage port;

determining, in response to a first operation for a first virtual earth surface unit of the at least two virtual earth surface units, at least one second virtual earth surface unit having a communication relationship with a passage port of the first virtual earth surface unit of the at least two virtual earth surface units; and setting a marking for at least one path between the first virtual earth surface unit and the second virtual earth surface unit.

Further, the step of marking at least one path between the first virtual earth surface unit and the second virtual earth surface unit comprises: marking, in response to a sliding operation on the large map of the game scene, road segments on the at least one path in sequence according to the sliding operation.

Further, before responding to a sliding operation on the large map of the game scene, the method further comprises: marking, by taking the first virtual earth surface unit as a starting point, a preset length of a road segment on the at least one path.

Further, the method further comprises: displaying, in response to the first operation for the first virtual earth surface unit of the at least two virtual earth surface units, a function control in a region associated with the first virtual earth surface unit.

Further, the function control comprises a jump control; the method further comprises: controlling, in response to a second operation for the jump control, a current first game visual field region to jump to a second game visual field region, wherein the first game visual field region comprises the first virtual earth surface unit, and the second game visual field region comprises the second virtual earth surface unit.

Further, the function control further comprises at least one of the following: a positioning control, a sharing control, and an expedition control.

Further, the distance between the first virtual earth surface unit and the second virtual earth surface unit in the large map of the game scene is greater than a preset distance.

Further, the step of marking at least one path between the first virtual earth surface unit and the second virtual earth surface unit comprises: marking the shortest path between the first virtual earth surface unit and the second virtual earth surface unit.

Further, the step of marking at least one path between the first virtual earth surface unit and the second virtual earth surface unit comprises: using a preset icon to mark each road segment on at least one path between the first virtual earth surface unit and the second virtual earth surface unit in sequence, wherein the preset icon is located above the corresponding road segment, and the preset icon is transparent.

Further, the method further comprises: determining a distance between each road segment and a virtual lens in the game; setting, according to the distance between each road segment and the virtual lens in the game, a transparency of the preset icon corresponding to each road segment, respectively.

Further, the graphical user interface further comprises a small map corresponding to the large map of the game scene; the method further comprises: determining an abbreviated path in the small map corresponding to the path marked in the large map of the game scene; and marking the abbreviated path.

Further, the step of marking the abbreviated path comprises: marking the abbreviated path with a dotted line.

Further, the method further comprises: hiddening the marking in response to a touch operation on a region other than the marked path in the large map of the game scene.

Further, the step of marking road segments on the at least one path in sequence according to the sliding operation comprises: determining a sliding direction of the sliding operation, and determining a target path to be marked according to the sliding direction; and marking, according to a sliding distance of the sliding operation, the road segments on the target path in sequence.

Further, the path comprises the first virtual earth surface unit, the second virtual earth surface unit, and at least one third virtual earth surface unit connecting the first virtual earth surface unit and the second virtual earth surface unit, wherein the at least two virtual earth surface units comprise the third virtual earth surface unit.

It can be seen from the above description that in the computer-readable storage medium of the present disclosure, at least one path between a first virtual earth surface unit with a passage port and a second virtual earth surface unit having a communication relationship with the above-mentioned passage port can be marked, the player can clearly know the travel route after entering the passage port, thereby assisting the player in performing the game operation, having good user experience, and solving the technical problems that the existing method for displaying a game has poor display effect and is inconvenient for players to operate.

The apparatus for displaying a game provided by the embodiments of the present disclosure may be specific hardware on the device or software or firmware installed on the device, or the like. The implementation principles and generated technical effects of the apparatus provided by the embodiments of the present disclosure are the same as those of the foregoing method embodiments. For brief description, the parts not mentioned in the apparatus embodiments can refer to the corresponding content in the foregoing method embodiments. Those skilled in the art can clearly understand that, for the convenience and brevity of the description, the specific working processes of the systems, apparatuses and units described above can all refer to the corresponding processes in the above-mentioned method embodiments, which will not be repeated here.

In the embodiments provided in the present disclosure, it should be understood that the disclosed apparatus and method may be implemented in other manners. The apparatus embodiments described above are only schematic, for example, the division of the units is only a logical function division, in actual implementation, there may be other division methods. For another example, multiple units or components may be combined or integrated into another system, or some features can be ignored, or not implemented. On the other hand, the shown or discussed mutual coupling or direct coupling or communication connection may be achieved through some communication interfaces, indirect coupling or communication connection of apparatuses or units, which may be in electrical, mechanical or other forms.

The units described as separate components may or may not be physically separated, and components displayed as units may or may not be physical units, that is, may be located in one place, or may also be distributed to multiple network units. Some or all of the units may be selected according to actual needs to achieve the purpose of the solution in this embodiment.

In the several embodiments provided in the present disclosure, it should be understood that the disclosed apparatus and method may also be implemented in other manners. The apparatus embodiments described above are merely schematic, for example, the flowcharts and block diagrams in the drawings shows the architecture, functionality, and operation implemented possibly by apparatuses, methods and computer program products according to various embodiments of the present disclosure. In this regard, each block in the flowchart or block diagram may represent a module, part of program segment or code, the module, part of program segment or code comprise one or more executable instructions for implementing specified logical functions. It should also be noted that, in some alternative embodiments, the functions noted in the block may also occur out of the order noted in the drawings. For example, two continuous blocks may, in fact, be concurrently executed substantially, or they may sometimes be also executed in the reverse order, which depends upon the functionality involved. It is also noted that each block of the block diagrams and/or flowcharts, and combinations of blocks in the block diagrams and/or flowcharts, may be implemented in dedicated hardware-based systems that perform the specified functions or actions, or may be implemented in a combination of dedicated hardware and computer instructions.

In addition, each functional unit in the embodiments provided by the present disclosure may be integrated into one processing unit, or each unit may also exist physically alone, or two or more units may also be integrated into one unit.

The functions, if implemented in the form of software functional units and sold or used as independent products, may be stored in a computer-readable storage medium. Based on this understanding, the technical solutions of the present disclosure in essence, or the parts that make contributions to the prior art or the parts of the technical solutions can be embodied in the form of software products. The computer software products are stored in a storage medium, which includes that several instructions are used to cause a computer device (which may be a personal computer, a server, or a network device, etc.) to execute all or part of the steps of the mobility control method described in the various embodiments of the present disclosure. The aforementioned storage medium includes: U disk, mobile hard disk, read-only memory (ROM for short), random access memory (RAM for short), magnetic disk or optical disk and various medium that can store program codes.

It should be noted that similar numerals and letters refer to similar items in the following drawings, therefore, once a certain item is defined in one drawing, no further definition and explanation are required in subsequent drawing, besides, the terms "first", "second", "third", etc. are only used to distinguish the description and should not be construed as indicating or implying importance in relativity.

Finally, it should be noted that the above-mentioned embodiments are only specific embodiments of the present disclosure, and are used to illustrate the technical solutions of the present disclosure, but not to limit them. The protection scope of the present disclosure is not limited to this, although the present disclosure has been described in detail with reference to the foregoing embodiments, those ordinarily skilled in the art should understand that any person skilled in the art who is familiar with the technical field can still make modifications to the technical solutions described in the foregoing embodiments or can easily think of changes within the technical scope disclosed in the present disclosure, or perform equivalent replacements to some of the technical features; however, these modifications, changes or substitutions do not cause the essence of the corresponding technical solutions to deviate from the scope of the technical solutions of the embodiments in the present disclosure, and should be included within the protection scope of the present disclosure.

What is claimed is:

1. A method for displaying a game, providing a graphical user interface of the game through a touch terminal, wherein the graphical user interface comprises a large map of a game scene, wherein the method comprises steps of:

providing at least two virtual earth surface units in the large map of the game scene, wherein the virtual earth surface units respectively have a passage port;

determining, in response to a first operation for a first virtual earth surface unit of the at least two virtual earth surface units, at least one second virtual earth surface unit having a communication relationship with a passage port of the first virtual earth surface unit of the at least two virtual earth surface units; and setting a marking for at least one path between the first virtual earth surface unit and the second virtual earth surface unit, wherein the step of setting a marking for at least one path between the first virtual earth surface unit and the second virtual earth surface unit comprises steps of:

marking, in response to a sliding operation on the large map of the game scene, road segments on the at least one path in sequence according to the sliding operation;

determining a sliding direction of the sliding operation, and determining a target path to be marked according to the sliding direction; and marking, according to a sliding distance of the sliding operation, road segments on the target path in sequence.

2. The display method according to claim 1, wherein before responding to the sliding operation on the large map of the game scene, the method further comprises a step of:

marking, by taking the first virtual earth surface unit as a starting point, a preset length of a road segment on the at least one path.

3. The display method according to claim 1, wherein the method further comprises a step of:

displaying, in response to the first operation for the first virtual earth surface unit of the at least two virtual earth surface units, a function control in a region associated with the first virtual earth surface unit.

4. The display method according to claim 3, wherein the function control comprises a jump control;

the method further comprises a step of:

controlling, in response to a second operation for the jump control, a current first game visual field region jump to a second game visual field region, wherein the first game visual field region comprises the first virtual earth surface unit, and the second game visual field region comprises the second virtual earth surface unit.

5. The display method according to claim 3, wherein the function control further comprises at least one of a positioning control, a sharing control, and an expedition control.

6. The display method according to claim 1, wherein a distance between the first virtual earth surface unit and the second virtual earth surface unit in the large map of the game scene is greater than a preset distance.

7. The display method according to claim 1, wherein the step of marking at least one path between the first virtual earth surface unit and the second virtual earth surface unit comprises a step of:

marking the shortest path between the first virtual earth surface unit and the second virtual earth surface unit.

8. The display method according to claim 1, wherein the step of marking at least one path between the first virtual earth surface unit and the second virtual earth surface unit comprises a step of:

using a preset icon to mark each road segment on at least one path between the first virtual earth surface unit and the second virtual earth surface unit in sequence, wherein the preset icon is located above a corresponding road segment, and the preset icon is transparent.

9. The display method according to claim 8, wherein the method further comprises steps of:

determining a distance between each road segment and a virtual lens in the game; and setting, according to the distance between each road segment and the virtual lens in the game, a transparency of the preset icon corresponding to each road segment, respectively.

10. The display method according to claim 1, wherein the graphical user interface further comprises a small map corresponding to the large map of the game scene;

the method further comprises steps of:

determining an abbreviated path in the small map corresponding to a path marked in the large map of the game scene; and marking the abbreviated path.

11. The display method according to claim 10, wherein the step of marking the abbreviated path comprises: marking the abbreviated path with a dotted line.

12. The display method according to claim 1, wherein the method further comprises a step of:

hiding the marking, in response to a touch operation on a region other than a marked path in the large map of the game scene.

13. The display method according to claim 1, wherein the path comprises the first virtual earth surface unit, the second virtual earth surface unit, and at least one third virtual earth surface unit connecting the first virtual earth surface unit and the second virtual earth surface unit, wherein the at least two virtual earth surface units comprise the third virtual earth surface unit.

14. A touch terminal, comprising a display presenting a game via a graphical user interface comprising a large map of a game scene, a memory, and a processor, wherein the memory stores instructions that, when executed by the processor, cause the touch terminal to:

provide at least two virtual earth surface units in the large map of the game scene, wherein the virtual earth surface units respectively have a passage port;

determine, in response to a first operation for a first virtual earth surface unit of the at least two virtual earth surface units, at least one second virtual earth surface unit having a communication relationship with a passage port of the first virtual earth surface unit of the at least two virtual earth surface units; and set a marking for at least one path between the first virtual earth surface unit and the second virtual earth surface unit, wherein the step of setting a marking for at least one path between the first virtual earth surface unit and the second virtual earth surface unit comprises steps of:

marking, in response to a sliding operation on the large map of the game scene, road segments on the at least one path in sequence according to the sliding operation;

determining a sliding direction of the sliding operation, and determining a target path to be marked according to the sliding direction; and marking, according to a sliding distance of the sliding operation, road segments on the target path in sequence.

15. A non-transitory computer-readable storage medium, storing machine-executable instructions, when the machine-executable instructions are invoked by a touch terminal, comprising a display presenting a game via a graphical user interface comprising a large map of a game scene, a memory, and a processor, the machine-executable instructions cause the processor to:

provide at least two virtual earth surface units in the large map of the game scene, wherein the virtual earth surface units respectively have a passage port;

determine, in response to a first operation for a first virtual earth surface unit of the at least two virtual earth surface units, at least one second virtual earth surface unit having a communication relationship with a passage port of the first virtual earth surface unit of the at least two virtual earth surface units; and set a marking for at least one path between the first virtual earth surface unit and the second virtual earth surface unit, wherein the step of setting a marking for at least one path between the first virtual earth surface unit and the second virtual earth surface unit comprises steps of:

marking, in response to a sliding operation on the large map of the game scene, road segments on the at least one path in sequence according to the sliding operation;

determining a sliding direction of the sliding operation, and determining a target path to be marked according to the sliding direction; and marking, according to a sliding distance of the sliding operation, road segments on the target path in sequence.

16. A method for displaying a game, providing a graphical user interface of the game through a touch terminal, wherein the graphical user interface comprises a large map of a game scene, wherein the method comprises steps of:

providing at least two virtual earth surface units in the large map of the game scene, wherein the virtual earth surface units respectively have a passage port;

determining, in response to a first operation for a first virtual earth surface unit of the at least two virtual earth surface units, at least one second virtual earth surface unit having a communication relationship with a passage port of the first virtual earth surface unit of the at least two virtual earth surface units; and setting a marking for at least one path between the first virtual earth surface unit and the second virtual earth surface unit, wherein the step of marking at least one path between the first virtual earth surface unit and the second virtual earth surface unit comprises a step of:

using a preset icon to mark each road segment on at least one path between the first virtual earth surface unit and the second virtual earth surface unit in sequence, wherein the preset icon is located above a corresponding road segment, and the preset icon is transparent, wherein the method further comprises steps of:

determining a distance between each road segment and a virtual lens in the game; and setting, according to the distance between each road segment and the virtual lens in the game, a transparency of the preset icon corresponding to each road segment, respectively.

* * * * *